July 29, 1969  C. G. ROBERTS  3,457,904
INTERNAL COMBUSTION ENGINE WITH IMPROVED INTAKE AND EXHAUST
Filed Aug. 5, 1968  4 Sheets-Sheet 1

INVENTOR
CHARLES G. ROBERTS
ATTORNEYS

July 29, 1969     C. G. ROBERTS     3,457,904
INTERNAL COMBUSTION ENGINE WITH IMPROVED INTAKE AND EXHAUST
Filed Aug. 5, 1968     4 Sheets-Sheet 2
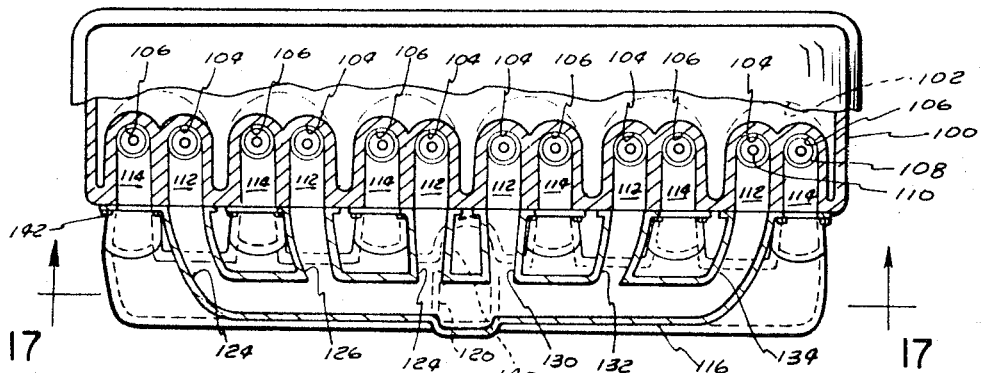
FIG.16
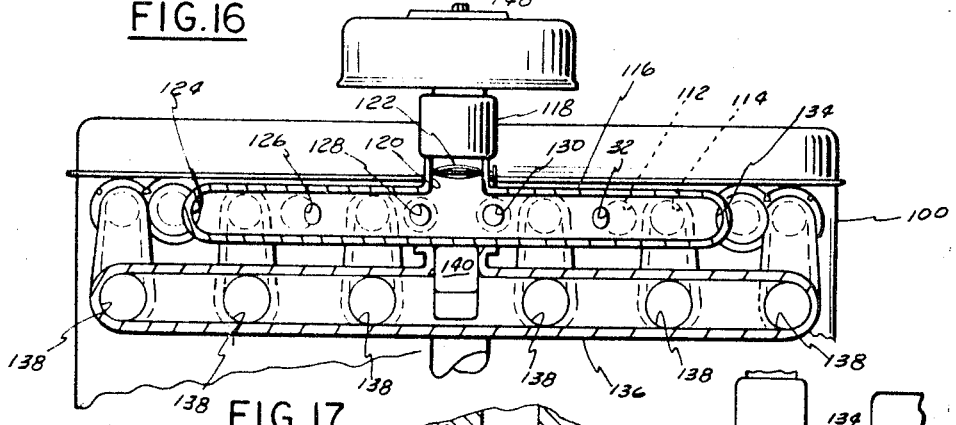
FIG.17
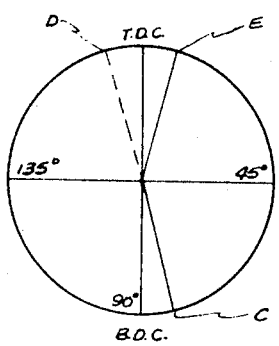
FIG.4A
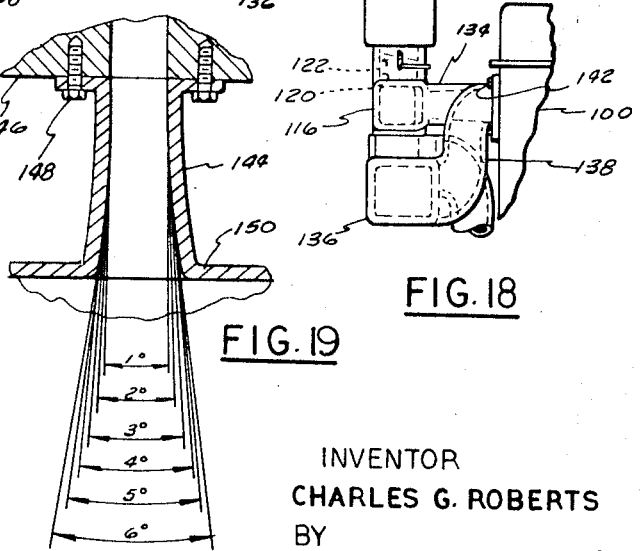
FIG.18
FIG.19
INVENTOR
CHARLES G. ROBERTS
BY
ATTORNEYS July 29, 1969 C. G. ROBERTS 3,457,904
INTERNAL COMBUSTION ENGINE WITH IMPROVED INTAKE AND EXHAUST
Filed Aug. 5, 1968 4 Sheets-Sheet 3

INVENTOR
CHARLES G. ROBERTS

ATTORNEYS

July 29, 1969 C. G. ROBERTS 3,457,904
INTERNAL COMBUSTION ENGINE WITH IMPROVED INTAKE AND EXHAUST
Filed Aug. 5, 1968 4 Sheets-Sheet 4
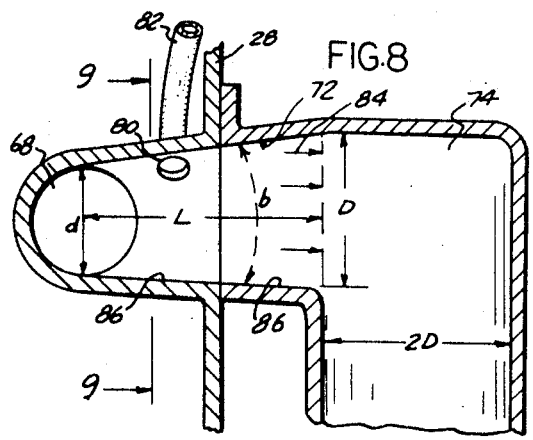
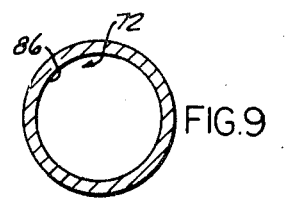
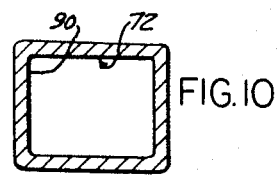
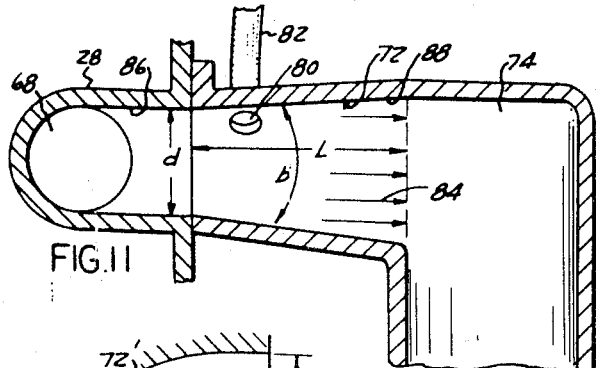
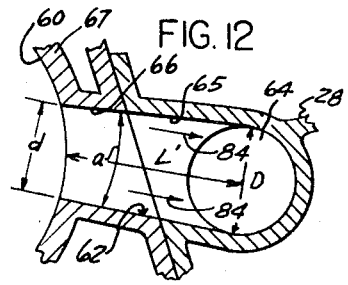
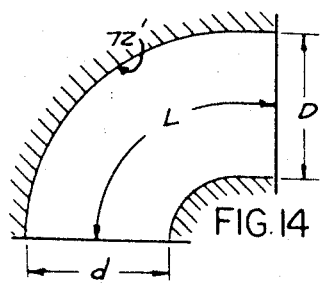
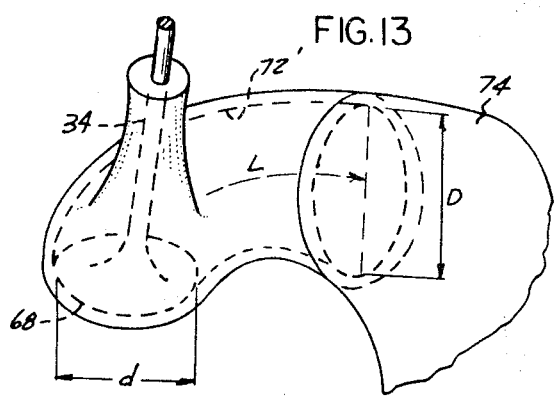
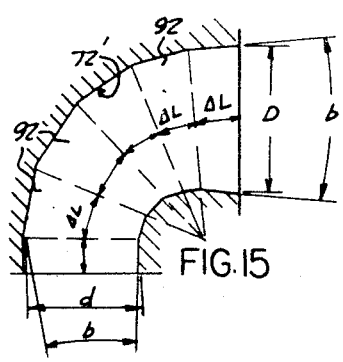
INVENTOR
CHARLES G. ROBERTS
ATTORNEYS

3,457,904
Patented July 29, 1969

1

3,457,904
INTERNAL COMBUSTION ENGINE WITH IMPROVED INTAKE AND EXHAUST
Charles G. Roberts, 1015 Michigan Ave., Howell, Mich. 48843
Continuation-in-part of application Ser. No. 617,957, Feb. 23, 1967. This application Aug. 5, 1968, Ser. No. 750,308
Int. Cl. F02b 27/00, 25/26, 75/10
U.S. Cl. 123—59    8 Claims

ABSTRACT OF THE DISCLOSURE

A configuration for intake and outlet port runners and manifolds for internal combustion engines providing all port runners with a substantially frusto-conical or equivalent shape for a portion of their length having a conicity including an angle between about 0° and 10° and with the largest cross-sectional area portion thereof disposed downstream relative to intake charge and exhaust gas flow, the cylinder exhaust valve being timed to open near the bottom dead center of the piston power stroke and to close substantially simultaneously with the cylinder intake valve opening near top dead center of the piston exhaust stroke. Each induction port runner having its length and included angle arranged to effect uniformity of all induction port runner flow rates at effective operating ranges of the engine.

Cross-reference to related applications

This application is a continuation-in-part of my co-pending application Ser. 617,957, filed Feb. 23, 1967.

Background of the invention

*Field of the invention.*—As is well known, internal combustion engines are far from being ideal energy conversion machines. Furthermore, particularly in multicylinder internal combustion engines, it is difficult to provide equal air to fuel mixture ratios and distributions at the intakes of all cylinders, with the result that a compromise must be reached whereby an overly rich mixture is usually provided so as to induct a rich enough mixture for the cylinders furthest removed from the intake plenum chamber in order to obtain a correct combustion of the charge in every cylinder. This results in too rich a mixture for some of the cylinders, with a correspondingly substantially large proportion of unburnt fuel and carbon monoxide being exhausted into the atmosphere from those cylinders operating with too rich a mixture at their intake, thus greatly contributing to atmospheric pollution.

It has been proposed to equalize the distribution of fuel-air mixture to the cylinders by the use of different sizes and lengths of intake port runners. However, this solution only produces distributional uniformity at a selected engine r.p.m. (usually within the engine "cruising" range). At other speeds, requiring that different volumes of mixture be inducted at different rates, distributional uniformity cannot be maintained, since flow resistance in a pipe varies with velocity of fluid through it, and such flow resistance is inherently greater in a longer port runner than in a shorter with increased velocity (and less with reduced velocity). Thus the distributional uniformity is upset at any time engine speed varies from the selected optimum.

In order to eliminate such unburnt hydrocarbons from the exhaust, it has been proposed to condense and eliminate the unburnt hydrocarbons in apparatus incorporated into the exhaust system or, alternatively, it has been proposed to employ an exhaust "afterburner" having an auxiliary air inlet into the exhaust system for the purpose of further oxidizing the unburnt hydrocarbons and carbon monoxide, thus exhausting more completely burnt residual gases into the atmosphere in order to reduce pollution. Such arrangements result in considerable power loss, in an increase in heat which must be removed by using increased capacity cooling ssytems, and in added manufacturing, maintenance and repair costs.

It is also well known that the exhaust system of a conventional internal combustion engine normally creates a substantial back pressure that causes difficulties in properly scavenging the combustion products from each cylinder. The usual expedient compromise for improving scavenging is to time the opening of each cylinder exhaust valve such that it occurs long before the end of each piston power stroke, i.e. long before the bottom dead center position of the crankshaft throw associated with that particular cylinder. This compromise results in further unburnt hydrocarbons being ejected into the atmosphere, and in a substantial reduction of the overall efficiency of the internal combustion engine.

It is also customary in internal combustion engines to provide an overlap between intake valve opening and exhaust valve closing, at the beginning of the piston intake stroke, in order to produce an aspirating effect at the intake valve opening to draw a complete fuel-air charge into the cylinder. Some of this raw fuel-air mixture inevitably must escape through the exhaust, adding to atmospheric pollution, and of course the unused fuel is an additional loss causing increased fuel consumption with no compensating energy recovery. Furthermore, the greater the overlap (intended to improve scavenging) the greater the atmospheric pollution, the greater the fuel consumption, and the less energy utilization per pound of fuel.

*Description of the prior art.*—In the application of which the present is a continuation-in-part, two U.S. patents are cited seeming to suggest diverging port runners.

U.S. Patent No. 908,527 shows an engine having a venturi-like diverging pipe exhaust intended to induct air which on the intake stroke is drawn in through the same port. This concept, if even workable, would be totally unacceptable for modern multi-cylinder engines, and it actually runs counter to the total flow characteristics of my invention.

U.S. Patent No. 610,114 appears at first glance to show a diverging intake port, but in fact divergence only compensates for the presence of the valve seat and stem, so that for all practical purposes the cross-sectional area remains substantially constant, thus lacking the present concept.

I know of no art which anticipates the present combination of charge induction and burned gas exhaust through diverging port runners, with valve timing to produce the total effect herein disclosed.

Summary of the invention

In the present invention, an appropriate design of each intake port runner between the intake plenum chamber, which in the case of a spark ignition engine is the carburetor plenum chamber, and each cylinder intake port, combined with an appropriate design of each exhaust port runner from each cylinder exhaust port to the exhaust manifold, provides a much improved charge distribution to and fuel-air mixture within each cylinder combustion chamber, such that the engine may be operated on close to the ideal air to fuel mixture ratio of 18 to 1 which, under all the conditions prevalent in conventional internal combustion engines, would otherwise result in too lean a mixture to ensure proper functioning of the engine. According to the present invention, either the intake port runners or the exhaust port runners, or both, for at least a portion of their lengths are of increasing cross-sectional area towards their outlets, being or equivalent to being substantially circular in cross-section and frusto-conical in shape along their longitudinal axes or even with the conicity angle increasing toward the downstream end to produce a bell-mouth appearance in longitudinal cross-section. Consequently an intake port runner has its largest cross-sectional area portion situated proximate the engine intake valve or its cylinder head port runner portion, while an exhaust port runner has its smallest cross-sectional area portion situated proximate the engine exhaust valve or its cylinder head port runner portion. With an arrangement whereby the exhaust port runners associated with an internal combustion engine have such frusto-conical or equivalent longitudinal shape, the exhaust of combustion products from each engine cylinder is so improved that the exhaust valve may remain closed for almost the complete piston power stroke and is timed to open only a few degrees before bottom dead center, with an accompanying improvement in efficiency of the engine through its longer effective power stroke. There is also considerable improvement resulting from the complete combustion of the fuel-air charge in each cylinder and greater energy utilization with consequent lower fuel consumption due to the increased burning time provided, hence a greater use of the piston power stroke.

Additionally, the invention contemplates providing an auxiliary air inlet disposed in each exhaust port runner, resulting in improved cooling of the exhaust valve and of the exhaust gases before they are discharged into the exhaust manifold of the engine, with further assurance of complete oxidation of any raw hydrocarbon remaining in the exhaust, as would be the case in the event of cold start with the carburetor choke mechanism in action or in the event that the carburetor air-fuel mixing system is not properly adjusted, or, in compression ignition engines, in the event that the fuel injecting system is not properly adjusted or balanced or when there is an obstruction in the air inlet piping.

The present concept in practice permits a change from conventional ideas in valve timing that completely eliminates the overlap between exhaust valve closing and intake valve opening since the aspirating effect produced by such overlap is no longer required. This produces numerous beneficial results, including reduced atmospheric pollution because raw hydrocarbon cannot be exhausted prior to exhaust valve closing, and more complete filling of the combustion chamber with a fuel charge due to the inertia of exhaust lowering the pressure at the intake to more rapidly induct the next charge. Further, exhaust valve delayed opening and earlier closing produces cooler exhaust valves since they remain on their coolant-jacketed seats for a greater percentage of time. Also, due to the present invention, exhaust gages are expelled faster so they don't contact the valves as long as in conventional engines.

The length of, and the included angle of, the frusto-conical or equivalent portion of the port runners are chosen experimentally to produce optimum engine performance, minimum fuel consumption, and minimum quantity of air-pollutant by-products, and will vary with different types of engines. The cross-sectional shape may be rectangular, oval, or any other preferred shape, but the divergence or increase in cross-sectional area is generated to always be equivalent to that of frusto-conical or increasing divergent bell-mouth passages having the preferred including angles and lengths.

Another advantage to the present intake port runners producing improved charge induction is that the size of the intake port runners from the plenum to the frusto-conical or equivalent portions may be reduced. Apart from reducing weight and cost, smaller passages make the increased velocity therethrough, resulting in less infringement and condensation of fuel droplets on the port runner walls.

Brief description of the drawings

The above and further advantages and objects of the invention will be more completely understood in the following description by reference to the accompanying drawings in which like reference characters refer to like parts throughout the several views and in which:

FIG. 4A is a diagram of the exhaust and intake cycle showing intake and exhaust valve timing;

FIG. 8 is an enlarged diagrammatic view of a portion of FIG. 6;

FIG. 9 is a lateral cross sectional view taken substantially on the line 9—9 of FIG. 8;

FIG. 10 is a modification of FIG. 9;

FIG. 11 is a modification of the structure shown in FIG. 8;

FIG. 12 is an enlarged diagrammatic view of a modified portion of FIG. 6;

FIG. 13 is a perspective diagrammatic view of an internal combustion engine exhaust valve and port runner according to a modification of the invention;

FIG. 14 is a diagrammatic longitudinal section view of the port runner of FIG. 13;

FIG. 15 is a diagrammatical illustration of the principles of the configuration of FIGS. 13–14;

FIG. 16 is a longitudinal horizontal cross-sectional view of an engine illustrating another embodiment of my invention;

FIG. 17 is a cross-sectional view taken substantially on the line 17—17 of FIG. 16;

FIG. 18 is a fragmentary end view of the engine of FIG. 16; and

FIG. 19 is a diagrammatic view of a modified port runner in which the conicity angle increases throughout its length to produce a substantially bell-mouth shape.

Description of the preferred embodiments

Figure 2:
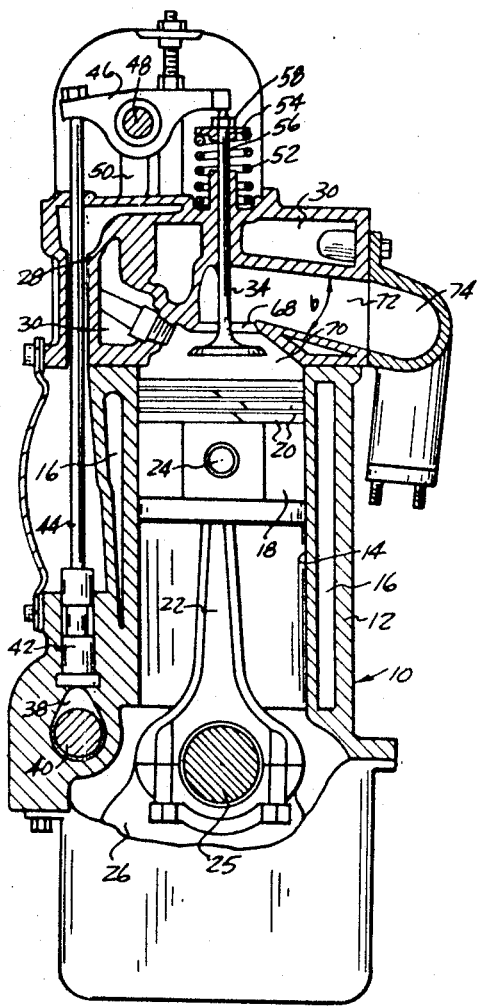
FIGS. 1 and 2 represent respectively transverse cross-sections of intake and exhaust portions of a preferred internal combustion engine having its cylinders disposed in line, and provided with improved intake and exhaust port runners according to the present invention.
Figure 1:
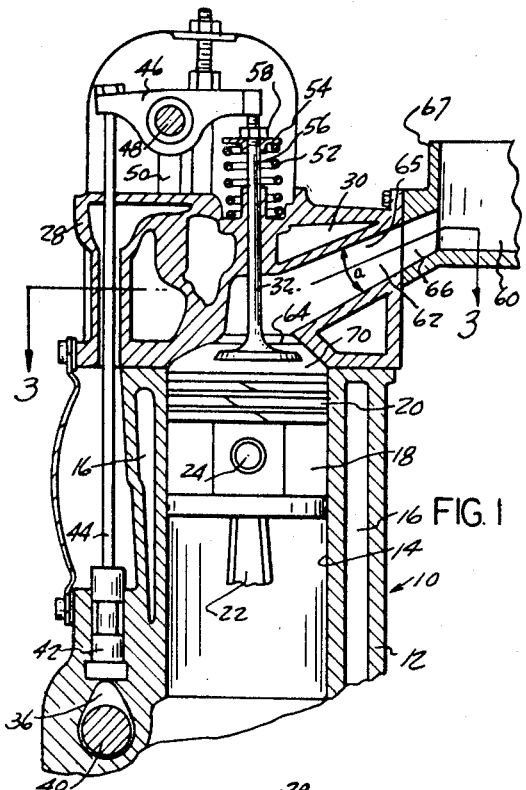
Figure 3:
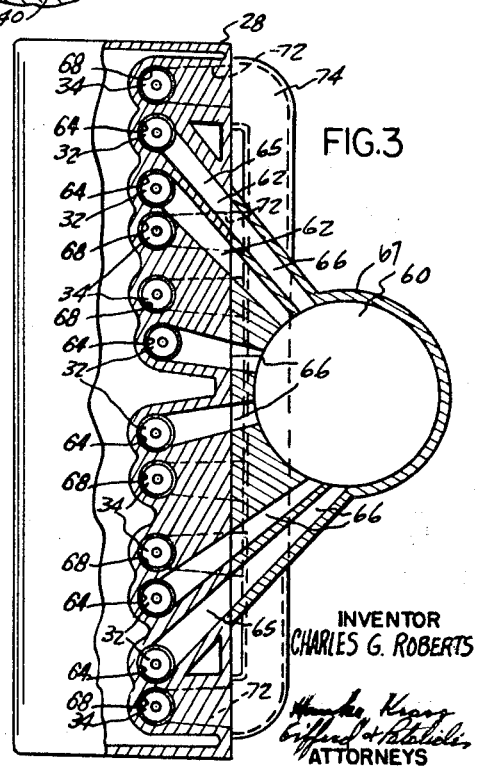
FIG. 3 is a diagrammatic longitudinal cross-sectional view of said engine taken substantially on the line 3—3 of FIG. 1.

Referring now to the drawings, and more particularly to FIGS. 1–3 thereof, an internal combustion engine 10, of the type having a plurality of cylinders disposed in line, and in the particular example illustrated being a six cylinder in-line engine, includes the usual and conventional elements of a cylinder block 12 having a plurality of parallel disposed cylinders 14 adapted to be cooled by a coolant fluid circulating through the collant jacket 16. Each cylinder 14 has a reciprocable piston 18 provided with rings 20, each piston being pivotably connected to a connecting rod 22 by way of a wrist pin 24 disposed at the small end of the connecting rod, the lower end of the connecting rod being pivotally connected to a crank throw 25 of a crankshaft 26 journalled in appropriate hearings (not shown) at the lower portion of the cylinder block 12. A cylinder head 28 provided with coolant passageways 30 is bolted on the top of the cylinder block, in the conventional manner, and is provided with the usual intake and exhaust valves, as shown respectively at 32 and 34, operated respectively by cams 36 and 38 on a camshaft 40 by way of the usual tappets 42, push rods 44 and rocker arms 46 pivoting on a shaft 48 attached to the top of the cylinder head 28 by way of columns 50. Each valve is provided with a return coil spring 52 held in compression between the top surface of the cylinder head 28 and a spring retainer 54 held proximate the end of the valve stem 56 by a retainer 58.

Such an arrangement of elements is conventional, is well known in the internal combustion engine art and need not be described in detail. It is also conventional in the internal combustion engine art to controllably place each cylinder in communication with an intake plenum chamber 60 which, in the event that the internal combustion engine is a spark ignition engine, is generally the plenum chamber of a fuel-air charge forming device or carburetor, by way of an intake passageway 62 having an inlet in communication with the plenum chamber, and an outlet proximate the cylinder intake port 64 controlled by the intake valve 32 and leading into the combustion chamber 70 at the upper end of the cylinder 14.

As best seen in FIGS. 1 and 3, each intake port runner 62 has a portion 65 formed in the cylinder head 28 and provided with an outlet at the intake port 64. The portion 65 is substantially aligned with a portion 66 which is attached to or integral with the casing 67 of the plenum chamber 60. Each intake port runner 62 thus defined is longitudinally frusto-conical or equivalent with its largest diameter portion proximate the intake port 64. The conicity of each port runner portion 65 has an included angle $a$ of between 0° and 10° and is preferably about 6°.

As best seen in FIGS. 2 and 3, each exhaust valve 34 is adapted to alternately obturate and open an exhaust port 68 placing each combustion chamber 70 into communication with an exhaust port runner 72 during the exhaust cycle of the respective cylinder piston in the course of which the residual combustion gases are exhausted to the atmosphere. Each exhaust port runner 72 places each exhaust port 68 in communication with an exhaust manifold 74, and all the exhaust port runners 72, for at least a portion of their lengths, are substantially frusto-conical or equivalent in shape with their smallest diameter portions proximate the exhaust ports 68. The conicity of the frusto-conical portion of each exhaust port runner 72 has an included angle $b$ of between 0° and 10° and is preferably about 6°.

The shape of each diverging port runner portion is, for convenience, herein described as frusto-conical, thereby presuming a circular cross-sectional shape diverging uniformly toward the downstream end, but it is understood that other cross-sectional shapes may be used, providing the cross-sectional area increases toward the downstream end on a generated angle or increasing angle which is equivalent to the included angle or angles of a cone or a bell-mouth. The cross-sectional shape may even vary from end to end, providing the effective cross-sectional area increases equivalently to that of the cone or a bell-mouth.

Figure 4:
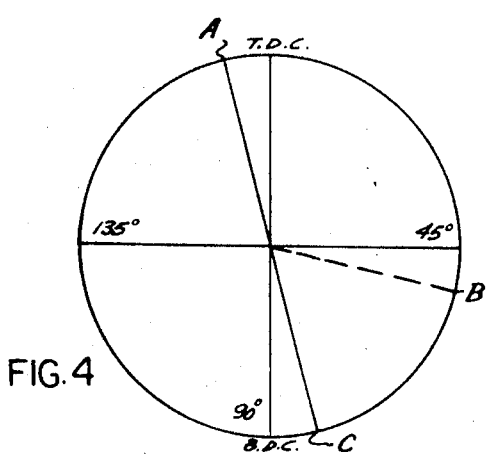
FIG. 4 is a diagram of the power and exhaust cycle showing exhaust valve timing of an internal combustion engine provided with the improvement of the present invention.

It has been found that providing the intake port runners of an internal combustion engine with downstream enlarged longitudinal conicity or bell-mouth form of between 0° and 10° including angle, and preferably with a conicity or maximum included angle of about 6°, results in substantially improved air-fuel mixture charges being taken into each cylinder of the engine and in improved combustion of each of the charges during the firing cycle accompanied by a better scavenging of the burnt gases exhausted when the exhaust port opens during the exhaust portion of the internal combustion engine cycle, with the advantages previously described. It appears that providing internal combustion engines with such frusto-conical, bell-mouth, or equivalent intake and exhaust port runner portions with the largest diameter portion of each port runner being downstream with respect to the direction of flow of the fluid traveling through the port runner, results in a considerable acceleration of the fluid at the outlet of each port runner as compared to the velocity of the fluid from a straight pipe. There is produced an enhanced ram effect of the intake air in compression ignition engines or of the fuel-air mixture in spark-ignition engines, effectuating a fuel-air charge that is considerably improved as compared to conventional means, both qualitatively, i.e. with respect to the degree of intimate mixture between the air and fuel, as well as quantitatively, i.e. with respect to the total amount of mixture introduced into the combustion chamber. Similarly as a result of using frusto-conical, bell-mouth, or equivalent diverging port runner portions in the exhaust system of an internal combustion engine, the scavenging of the burnt gases is so improved by the resulting suction effect at the exhaust port that the timing of the opening of the exhaust valve at the end of each cylinder combustion cycle may be delayed to a degree such that full advantage is taken of the complete expansion of the burning air-fuel mixture in the cylinder, with consequent power gain. In fact, this changed exhaust valve timing is a necessity in order to achieve the improved results herein described. Conventional exhaust valve timing is detrimental to the engine having the present exhaust port runner configuration. In conventional internal combustion engines, which are today designed with a substantially short piston stroke and with a large cylinder bore, or, in other words, which are designed with a bore-to-stroke ratio substantially equal to or greater than one, and which are capable of operating at substantially high speeds, it is common practice to open the exhaust port of each cylinder long before the end of the combustion cycle in order to provide adequate scavenging of the residual combustion products from the cylinder. As shown in the chart of FIG. 4, which represents a complete revolution of an internal combustion engine crankshaft throw during the power and exhaust cycle of a particular cylinder, firing of the air-fuel mixture is effected in a spark ignition engine, or injection of the fuel is started in a compression ignition engine, shortly before the piston reaches top dead center, as shown at point A situated a few degrees before top dead center. The exhaust valve is normally timed to open in conventional engines long before bottom dead center, or substantially at point B on the diagram of FIG. 4. By virtue of using the longitudinally frusto-conically (or equivalent) shaped exhaust port runners of the present invention, the exhaust valve of each cylinder should be timed to open only shortly before bottom dead center or substantially at bottom dead center, as shown at point C, without compromise in any way to the proper scavenging of the cylinder, with the accompanying result of a greatly improved overall efficiency resulting from the fired charge being completely expanded and continuously pressing against the top of the piston up to the full effective limit of the piston stroke when it reaches a position proximate to bottom dead center.

Furthermore, as shown in FIG. 4A, a chart representing a complete revolution of an engine crankshaft throw during the exhaust and intake cycle of a particular cylinder, the overlap between intake valve opening and exhaust valve closing can be completely eliminated. Point D on the chart is the conventional intake valve opening point, occuring shortly before top dead center near the end of the scavenge or exhaust stroke, and point E is the conventional exhaust valve closing point, occurring shortly after top dead center. In that period of time between points D and E, deemed necessary in conventional engines to take advantage of the aspirating effect for initiating rapid charge intake, some of the raw mixture inevitably escapes through the exhaust port, increasing atmospheric pollution and representing lost fuel. Under conditions existing with the present invention, scavenging during the exhaust stroke is more complete and ramming of the charge during the intake stroke is more effective, due to the frusto-conical or equivalent shapes of the port runners, so that the intake valve opening should be delayed to point E, completely eliminating the overlay D–E whereby no fuel-air charge is lost and the total volume of fuel inducted is available for combustion which, due to the delayed exhaust valve opening previously described, is more complete, resulting in fewer pollutants, both raw fuel and combustion products, being exhausted to the atmosphere.

Figure 5:
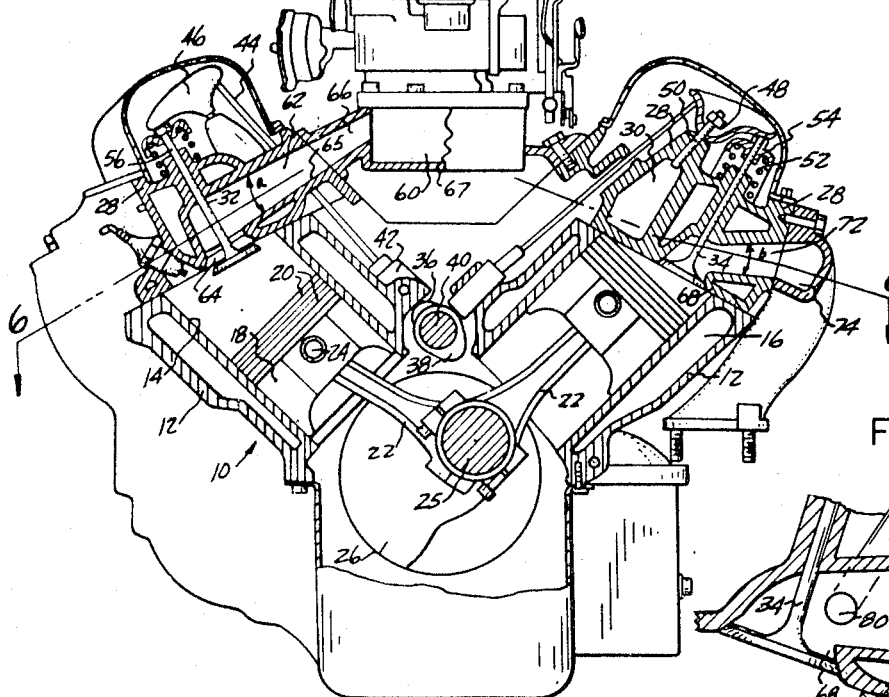
FIG. 5 is a transverse cross-sectional view of an internal combustion engine having its cylinders disposed in a V and provided with improved intake and exhaust port runners according to the present invention.
Figure 6:
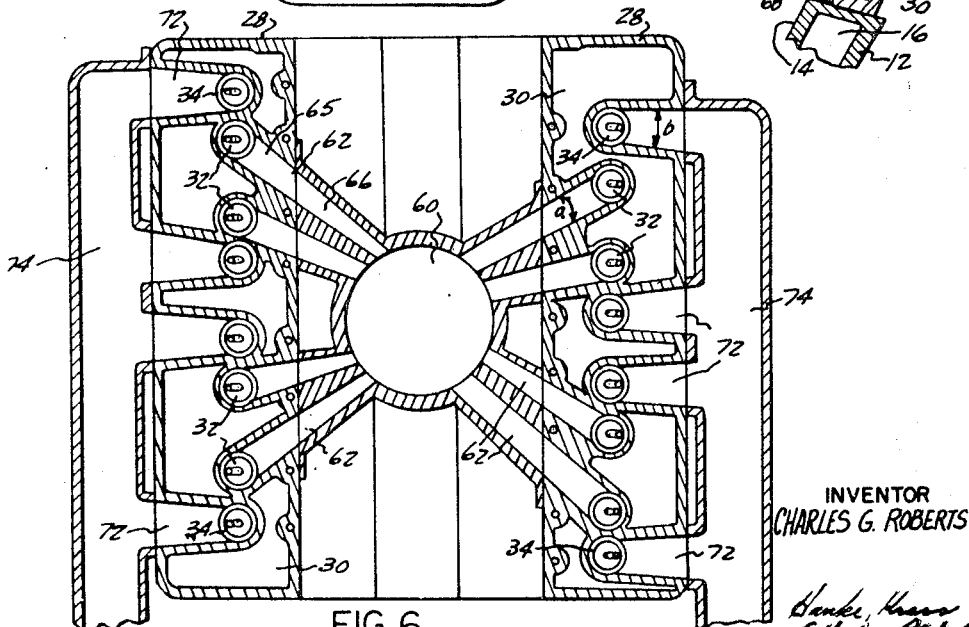
FIG. 6 is a diagrammatic longitudinal cross-sectional view of the engine of FIG. 5 taken substantially on the line 6—6 of FIG. 5.

FIGS. 5–6 represent a preferred application of the principles of the invention to an internal combustion engine of the spark-ignition type having its cylinders disposed in a V. The arrangement of elements is otherwise substantially the same as previously described with respect to FIGS. 1–4, and the operation of the invention is the same.

Figure 7:
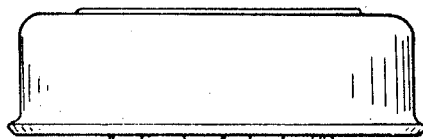
FIG. 7 is a fragmentary enlarged view of a portion of FIG. 5 incorporating a modification according to the present invention.

As shown in the drawings, the intake and exhaust port runners have a downstream conicity angle of between 0° and 10°, and preferably of about 6°. Each exhaust port runner 72 may be additionally provided, as best shown in FIG. 7, with an auxiliary air inlet 80 connected to a pipe 82 open to the atmosphere, the inlet 80 being preferably disposed proximate the exhaust port 68, such that substantially cooler air may be introduced into and mixed with the exhaust gases so as to considerably reduce their temperature and provide excess oxygen for completing the oxidation of any unburnt hydrocarbon and of carbon monoxide that may be present in the exhaust gases. It should, however, be appreciated that, as a result of providing an internal combustion engine with the intake and exhaust port runners of the present invention, there is a considerable reduction of the quantity of the unburnt hydrocarbons exhausted into the atmosphere, to the point that the engine may be run on a lean mixture close to the ideal volumetric proportion of 18 to 1 of the air-to-fuel ratio. However, an engine modified according to the present invention could possibly result in exhaust gases at higher temperature than would be the case with conventional engines due to the fact that the improved engine is capable of operating with a mixture which is much leaner. The air inlets 80 into the exhaust passageways 72 eliminates this inconvenience by providing additional cooling for the exhaust valves 34.

However, since the valve timing with the present invention results in the exhaust valve remaining on the coolant-jacketed seat for a longer period of time than in conventional engines, it is not expected that further cooling, even though desirable, will be necessary.

FIG. 8 is a schematic representation of a typical exhaust port runner constructed according to the present invention, with the exhaust valve omitted for the sake of clarity. As previously explained, the port runner 72 placing in communication the exhaust port 68 of the internal combustion engine combustion chamber with an exhaust plenum chamber or exhaust manifold 74 is bell-mouthed or frusto-conical with the diverging conicity therethrough, such direction being shown in the drawing by arrows 84. Consequently, the diameter $d$ of the inlet of the port runner 72 is smaller than the diameter $D$ of its outlet into the exhaust manifold 74, in view of such diverging conicity of the port runner 72 having an included angle $b$ of between 0° and 10° and being preferably about 6°. The port runner 72 has a length L which, as determined experimentally, is preferably equal to substantially twice the diameter $d$ of the inlet of the port runner 72, assuming that the port runner 72 has a circular cross section, as shown at FIG. 9.

In order to provide for such a length L of the port runner 72 being substantially equal to twice the diameter $d$ of its inlet, when the portion 86 of the port runner 72 which is situated in the cylinder head 28 of an internal combustion engine is not long enough to fulfill the length requirement, the exhaust port runner 72 may be so designed as to include a portion 84 affixed exteriorly of the cylinder head 28. The portion 84 is secured to or formed integral with the exhaust manifold 74, such that the total length L of both portions 86 and 88 of the exhaust port runner 72 is substantially equal to twice the diameter $d$ of the port runner inlet.

The diameter of the exhaust manifold 74, assuming that the manifold conduit is circular in cross-section, is preferably at least twice the diameter D of the outlet of the exhaust port runner 72 into the manifold. It is evident that, when it is not feasible to have a circularly shaped conduit for the exhaust manifold 74, other shapes may be used, providing that the transverse cross-sectional area of the manifold is preferably twice the cross-sectional area of the outlet of the port runner 72 into the exhaust manifold.

As shown in FIG. 10, the exhaust runner 72 may have a cross-section which is substantially rectangular in shape, as shown, or which is of any other convenient shape, in cases where it is impractical to have circularly shaped exhaust port runners due to complications in coring the casting mold for the cylinder head, or to other prevalent engineering problems. Although circularly cross-sectional frusto-conical or bell-mouthed runners are the preferable configuration, it has been found that there exists only a small loss in fluid flow efficiency if the port runner is of different cross-section. However, whatever the transverse sectional shape of the port runner, the total length thereof is preferably substantially equal to twice the diameter of an imaginary circular inlet having an area equal to the area of the actual inlet of the port runner. In other words, the length of port runner 72 must fulfill the following conditions:

$L = 2d$.

Where the inlet of the port runner 72 is circular, and the area of the inlet is given by:

$$A = \pi \frac{d^2}{4}$$

Consequently $$d^2 = \frac{4A}{\pi} \text{ and } d = 2\sqrt{\frac{A}{\pi}}$$

As $L = 2d$ $$L = 4\sqrt{\frac{A}{\pi}}$$

As illustrated in FIG. 11, when the conditions are such that the exhaust port runner 72, assumed to be circular in cross-section, has a portion 86 included in the cylinder head 28 of the internal combustion engine and having substantially straight instead of frusto-conical configuration, the principles of the present invention are still applicable if the outlet of the portion 86 of the exhaust port runner disposed in the cylinder head 28 is connected to the manifold 74 by means of a frusto-conical portion 88 mounted upon, or made integral with, the manifold 74, and having a total length L substantially equal to twice the diameter $d$ of the inlet thereof. Preferably, included angle $b$, as previously mentioned, is substantially equal to 6° and generally of between 0° and 10°.

Preferably also, as shown in FIGS. 7 and 8, one or more auxiliary air inlets or ports 80 are provided in the exhaust port runner 72. The ports 80 are placed in communication with the atmosphere by means of conduits such as 82. As previously indicated, such auxiliary air ports 80 are preferably disposed as closely as possible to the exhaust port 68, as shown in FIG. 8, which may necessitate substantial alterations to the cylinder head 28. In the event such alterations are prohibitive in cost or in engineering difficulties, it is satisfactory to locate such auxiliary air ports 80 in the portion of the exhaust port runner 72 situated outside of the cylinder head, as shown in FIG. 11, the auxiliary air inlets or ports 80 being disposed as close as feasible to the inlet of exhaust port runner 72.

FIG. 12 represents a schematic enlarged view of an intake port runner 62 according to the present invention and as previously explained hereinbefore. The fuel-air charge circulating in such an intake port runner 62 flows in the direction of arrows 84 from an inlet of the port runner disposed in the plenum chamber 60 to the intake port 64 leading into the engine cylinder combustion chamber. The intake port runner 82 has a total length L' which is substantially equal to twice the diameter $d$ of the inlet portion thereof, assuming that the port runner has a circular cross-section, or which is substantially twice the diameter of an imaginary circle of an area equal to the actual area of the inlet of the port runner 62, in the event that the port runner 62 is shaped other than a circle in transverse cross-section. The general longitudinal configuration of the inlet port runner 62, as previously mentioned, is bell-mouthed or frustoconical, with an included angle $a$ of between 0° and 10°, and preferably about 6°.

Internal combustion engines are not always so designed that it is possible to utilize intake or exhaust port runners having substantially straight line longitudinal axes. The principles of the present invention, however, apply to longitudinally curved port runners as well as to straight port runners. For example, as shown in FIGS. 13–15, the principles of the invention can be applied to a 45-degree elbow port runner, the configuration illustrated herein being a 45-degree elbow exhaust port runner 72'. It should, however, be appreciated that the principles of the invention apply to differently bent intake or exhaust port runners. As shown in the drawings, the curved port runner 72' places an exhaust port 68 in communication with an exhaust manifold 74. The port runner 72' has a total length L which is substantially equal to twice the diameter $d$, assuming the port runner 72' to be substantially circular in cross-section. The port runner 72' can be considered as being made up of an infinity of smaller elements 92 each having a length $\Delta L$ as illustrated diagrammatically in FIG. 15, and each having a conicity of included angle $b$ of between 0° and 10° and preferably of 6°. Consequently, the total length L of the port runner 72' is equal to the sum of the individual element lengths $\Delta L$, and such total length L is substantially equal to twice the diameter $d$ of the inlet of the port runner.

FIGS. 16, 17 and 18 illustrate a further modification of the present invention in which all of the inlet and exhaust port runner portions having downstream-diverging cross-sectional areas are disposed exteriorly of the engine cylinder head and constructed integrally with the induction and exhaust manifolds.

As shown, an engine cylinder head 100 overlies engine cylinders 102 and has intake ports 104 and exhaust port 106 in communication with the cylinders 102, the ports being alternately opened and closed by intake valves 108 and exhaust valves 110 in customary fashion. The ports 104 and 106 open to cylinder head air intake and exhaust port runner portions 112 and 114 respectively, which port runner portions are of substantially uniform cross-sectional areas throughout their lengths and are integrally formed within the cylinder head in conventional fashion, opening from the side thereof as shown. It may be noted that although these port runner portions are shown as being longitudinally straight, they may be curved and the inner ends thereof may be enlarged to compensate for the volumes occupied by the valves and their bosses (not shown).

An induction manifold 116 receives the inducted fuel-air charge in the central portion thereof from a conventional downdraft carburetor 118 through a throttle opening 120 provided with a throttle butterfly valve 122, and distributes said charge into port runner portions 124, 126, 128, 130, 132 and 134 which lead respectively to and register at the downstream ends with the intake openings of the cylinder head 100 at the outer ends of the intake port runner portions 112.

The port runner portions 124, 126, 128, 130, 132 and 134 are constructed of different lengths and/or different divergent angular conicities which lengths and conicities are chosen to effectively equalize the volume flow into the engine cylinders. It has been determined that in all conventional engines, there appears a wide disparity of the fuel-air charge volume flow into the various cylinders of the engine. Various manifold designs have been proposed in which lengths of the port runners are varied, but in all cases of which I am aware, as may be proven by flow-rate tests, the compensating factors tend to equalize flow only in a narrow range of engine operation, usually in the cruising range, while in other operating ranges it will be found that volume flow is higher or lower, resulting in either richer or leaner mixtures being delivered to some cylinders than to others. This is because flow resistance varies with both length of the port runner and velocities, so that length compensation only operates effectively with one particular velocity of the inducted charge. Therefore, in order to obtain an adequate combustible charge to all cylinders at all times, the carburetor must be adjusted to give the proper mixture to that cylinder which, because of the disparity in flow rates, normally receives the leanest charge. This results in there being too rich a mixture delivered to the other cylinders, resulting in an increase of pollutants due to uncombusted hydrocarbons and in loss of fuel economy in the overall engine performance. With the present concept, the lengths and conicities of the port runner portions 124, 126, 128, 130, 132 and 134 are adjusted experimentally until all port runners have equal volume flow rates regardless of the performance ranges of the engines.

An exhaust manifold 136 is also provided, preferably in position below the intake manifold 116, with frustoconical or equivalent exhaust port runner portions 138 leading to and registered with the openings in the side of the engine cylinder head 100 leading to the exhaust port runner portions 114 as shown. The gases exhausted into the manifold 136 pass in heat exchange relation with the central portion of the intake manifold 116 through an exhaust passage 140. Each exhaust port runner 138 is of diverging cross-sectional area as shown to produce the high flow exhaust characteristics previously described. The two manifolds 116 and 136 are mounted as shown to the side of the cylinder head 100 by any means such as bolts 142. It will be seen that the manifolds as described permit the adaptation of a conventional internal combustion engine to the present invention without changing the cylinder head construction.

For convenience, the port runner portions previously described have been shown as being substantially frustoconical or equivalent, but they may be bell-mouthed in form as well. In actuality, a bell-mouth shape can be conceived as being merely an infinite series of frusto-conical elements, with the downstream end of one element open to the upstream end of the successive element, and the successive elements having progressively increasing included angles of conicity. FIG. 19 illustrates a bell-mouth port runner 144, in this case an exhaust port runner, adapted for mounting to the side of a cylinder head 146 by any means such as bolts 148, and with the downstream end of the port runner 144 opening into an exhaust manifold 150. As illustrated diagrammatically, the bell-mouth port runner 144 has included angles of "conicity" of successively increasing angularity, varying from 0° upward to 6°, providing an optimum performance exhaust port runner.

I claim:

1. In an internal combustion engine having a crankshaft, a plurality of cylinders each with a crankshaft-connected piston reciprocal therein, a cylinder head structure having associated with each cylinder intake and exhaust ports with valves alternately opening and closing same, charge induction and exhaust discharge manifolds, and port runners openly connecting each intake port with said induction manifold and each exhaust port with said exhaust manifold, the improvement comprising:

(a) each port runner having at least a portion being frustoconically-equivalent with its smaller cross-sectional area end constituting its inlet and its larger cross-sectional area end constituting its outlet;

(b) the conicity-equivalent included angle of cross-sectional area divergence of each port runner being between about zero and ten degrees; and (c) Each induction port runner being its length and said included angle arranged to effect uniformity of all induction port runner flow rates throughout the effective operating ranges of said engine.

2. The improvement of claim 1 wherein said port runners comprise portions in said cylinder head structure and portions connecting said cylinder head portions with said manifold, and at least some of said port runners having their frustoconically-equivalent portions disposed completely in said portions connecting the cylinder head portions with the associated manifold.

3. The improvement of claim 1 wherein said port runners comprise portions in said cylinder head structure and portions connecting said cylinder head portions with said manifold, and all of said port runners having their frustoconically-equivalent portions disposed completely in said portions connecting the cylinder head portions with said manifolds.

4. The improvement of claim 3 wherein said connecting portions are integral with said manifolds.

5. The improvement of claim 1 wherein at least some of said frustoconically-equivalent port runners are formed to have bell-mouth configurations, with the conicity-equivalent included angle increasing progressively from the inlet to the outlet end.

6. The improvement of claim 1 wherein the lengths of said exhaust port runner frustoconically-equivalent portions are substantially of equal lengths and conicity-equivalent included angles.

7. The improvement of claim 1 wherein said exhaust valves are operable to open at substantially the end of the combustion cycle of said piston shortly before bottom dead center of the rotation of said crankshaft.

8. The improvement of claim 7 wherein said exhaust valves are operable to close and the intake valves are operable to open substantially simultaneously and near top dead center of the rotation of said crankshaft at the end of the exhaust cycle of said piston.

References Cited

UNITED STATES PATENTS

| | | | |
|---|---|---|---|
| 908,527 | 1/1909 | Weiss | 60—30 |
| 3,285,002 | 11/1960 | Hines | 60—30 |

FOREIGN PATENTS

| | | |
|---|---|---|
| 610,114 | 10/1948 | Great Britain. |
| 97,576 | 2/1961 | Norway. |

WENDELL E. BURNS, Primary Examiner

U.S. Cl. X.R.

60—29, 30; 123—52, 75, 188, 193